United States Patent [19]

Vasiliev et al.

[11] 4,264,417
[45] Apr. 28, 1981

[54] ELECTROCHEMICAL METHOD FOR PROCESSING WORK-PIECES

[76] Inventors: Valadimir S. Vasiliev, Lomonosovsky prospekt, 18, kv. 226; Genrikh A. Alexeev, Selskokhozyaistvennaya ulitsa, 13, korpus 1, kv. 62; Viktor K. Nastasy, ultisa Volgina, 23, korpus 1, kv. 13; Roalda B. Isakova, ulitsa Valvilova, 70, korpus 3, kv. 237; Abram L. Livshits, Leninsky prospekt, 11, kv. 62, all of Moscow; Jury F. Prasolov, ulitsa Engelsa, 1, kv. 9; Alexandr I. Safronov, ulitsa Polezhaeva, 159, kv. 44, both of Saransk, all of U.S.S.R.

[21] Appl. No.: 105,072

[22] Filed: Dec. 19, 1979

[51] Int. Cl.³ .......................... B23P 1/00; B23P 1/02; B23P 1/14
[52] U.S. Cl. ........................ 204/129.43; 204/129.5; 204/129.7; 204/225; 204/DIG. 9
[58] Field of Search ............. 204/129.5, 129.43, 129.7, 204/DIG. 8, DIG.9, 225

[56] References Cited

U.S. PATENT DOCUMENTS

| | | | |
|---|---|---|---|
| 3,378,473 | 4/1968 | Inoue | 204/129.5 X |
| 4,097,710 | 6/1978 | Maillet | 204/129.43 X |
| 4,125,444 | 11/1978 | Inoue | 204/DIG. 9 |
| 4,160,710 | 7/1979 | Greenwood | 204/DIG. 9 |

FOREIGN PATENT DOCUMENTS

| | | | |
|---|---|---|---|
| 2101371 | 3/1972 | France | 204/129.5 |
| 2160066 | 6/1973 | France | 204/129.5 |
| 347152 | 10/1972 | U.S.S.R. | 204/129.5 |

OTHER PUBLICATIONS

Nastasy, V. K. "Protection of Electrodes of Electrochemical Machines from Short Circuits," *Machines and Tools*, No. 5, 1973, p. 21.

USSR Inventor's Certificate No. 205,489, Int. Cl.CZ3B 3/00, Bulletin of Inventions and Discoveries No. 23, 1967.

*Primary Examiner*—G. L. Kaplan
*Assistant Examiner*—D. R. Valentine
*Attorney, Agent, or Firm*—Fleit & Jacobson

[57] ABSTRACT

A method of electrochemical processing comprises the steps as follows: maintaining a variable gap between a processing electrode and a work-piece, having a value equal to a minimum permissible gap corresponding to processing conditions; with the gap value reaching a critical value, moving the processing electrode to obtain a gap approximately equal to or less than the critical value; applying a train of voltage pulses; and changing the length of each pulse and/or the space interval between pulses. When the space interval becomes equal to a value commensurate with the time of withdrawal of the processing electorode, a single voltage pulse is applied.

An apparatus for chemical processing comprises two pickups to sense the gas content of the interelectrode space, open of said pickups being coupled to the drive means control unit, a pickup to sense the state of contact of the processing electrode and the workpiece, a processing duty decoder coupled to a program control unit to control the movement of the processing electrode. The apparatus also comprises a control signal decoder to decode control signals characteristic of the required gap, a gap value program control unit, and a control unit to control the operating duties of the voltage source.

10 Claims, 7 Drawing Figures

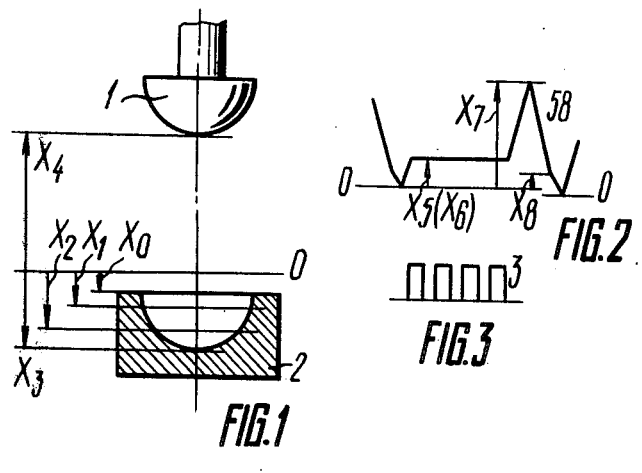
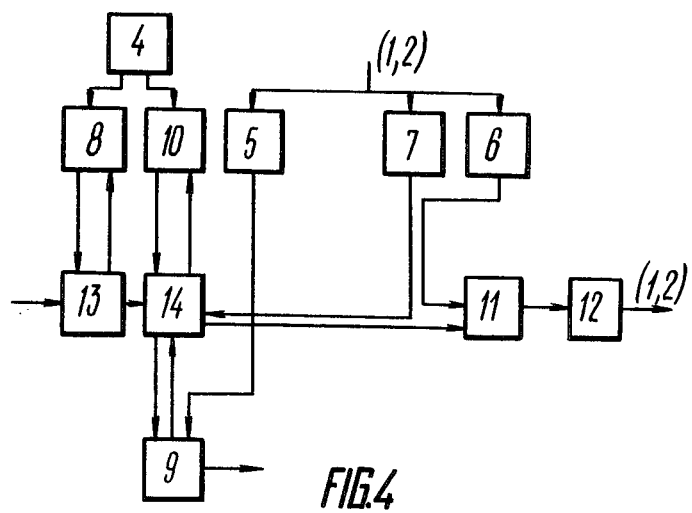

ELECTROCHEMICAL METHOD FOR PROCESSING WORK-PIECES

BACKGROUND OF THE INVENTION

The invention relates to means for processing work-pieces made of electrically conducting metals, and more particularly for methods and apparatus for electrochemical processing of work-pieces.

The invention is suitable for use in processing work-pieces of complex spatial configuration such as dies, press moulds, turbine blades on electrochemical copying-piercing machines.

DESCRIPTION OF THE PRIOR ART

Known in the art are various methods of electrochemical processing of work-pieces utilizing continuous and pulsed current supply duties.

In the case of a continuous supply duty, a d.c. voltage is applied to the processing electrode and work-piece and the processing electrode is put in motion until a desirable gap is obtained between it and the work-piece. A water solution of an electrolyte is pumped through the gap thus formed so that the electrolysis products are removed from the gap. As the processing electrode penetrates into a work-piece of complex spatial configuration, the processing conditions change considerably, the gap increases and the processing accuracy is thus impaired. As a result, the processing errors might exceed the prescribed limits (cf. an article by V. K. Nastasy entitled "Protection of Electrodes of Electrochemical Machines from Short Circuits", Machines and Tools, No. 5, 1973, p.21).

There is a method of pulsed electrochemical processing of work-pieces, which utilizes pulsed current and translational motion of the processing electrode. In this method, the processing electrode is moved periodically towards the work-piece to select the required interelectrode space and is then moved back to allow for the pumping of an electrolyte water solution aiming at the withdrawal of the electrolysis products (cf. the USSR Inventor's Certificate No. 205,489, Int. Cl. C23B 3/00, Bulletin of Inventions and Discoveries No. 23, 1967).

In the case of pulsed processing, the length of pulses and space intervals is held constant. In operation, the processing conditions change, however, considerably, with the result that the gas content of the interelectrode space varies too. It is, therefore, good practice to change the length of pulses and their space intervals in order to obtain the required efficiency and accuracy of processing and to provide for effective removal of the electrolysis products from the interelectrode space.

The literature known in the art does not handle a combination of electrochemical processing methods and pulsed supply modes since no characteristic data is available.

Known in the art is an apparatus for control of an electrochemical processing machine, comprising a pickup to sense the processing electrode movement, coupled to a numerical program control unit to control the processing electrode movement, and a control unit to control the feed drive for the processing electrode, coupled to the numerical program control unit. The described apparatus makes it possible to vary the rate of feed of the processing electrode and to process electrochemically the work-pieces both in continuous and pulsed supply modes. However, with the apparatus it is impossible to select automatically the required operating duty in accordance with changes in the processing conditions such as the amount of the electrolysis products, the gas content of the interelectrode space, and the attainable accuracy of processing.

The electrochemical processing in this case cannot be automated completely, with the result that manual finishing costs are increased and the production efficiency is considerably decreased.

SUMMARY OF THE INVENTION

An object of the invention is to provide an automatic method of electrochemical processing of work-pieces and an apparatus for effecting the same.

Another object of the invention is to provide for an increased processing accuracy.

Yet another object of the invention is to provide for an increased efficiency of electrochemical processing due to a decrease in manual finishing time for the work-pieces.

Another object of the invention is to provide for a method of electrochemical processing of work-pieces, based on both a continuous and pulsed operating mode.

There is provided a method of electrochemical processing of work-pieces of electrically conducting materials, comprising steps as follows: applying a d.c. voltage to a processing electrode and to a work-piece; moving the processing electrode until a gap between it and the work-piece is obtained which is required for proper processing of the work-piece; pumping, in the course of the electrode movement, a water solution of an electrolyte; according to the invention, maintaning said gap variable to obtain its value equal to a minimum permissible one at which adequate processing is achieved; with the gap value reaching a critical one at which the required accuracy of processing is decreased, adjusting the processing electrode with respect to the work-piece so as to bring the gap value to that approximately equal to or less than said critical value; applying a train of voltage pulses to the electrodes which corresponds to a preset value of said gap; withdrawing the processing electrode, after cessation of said train of voltage pulses, so as to allow for the removal of the electrolysis products from the interelectrode space; changing the length of each of said pulses and/or the space interval therebetween to attain conditions under which the electrolysis products are removed adequately; with the space interval increasing up to a value commensurate with the withdrawal time for the processing electrode, applying a single voltage pulse and adjusting the processing electrode relative to the workpiece to obtain a gap with which the required processing accuracy is achieved.

Advantageously, the gap between the processing electrode and the work-piece, equal to a minimum permissible gap, should be held variable in accordance with the gas content of the interelectrode space.

Preferably, setting the processing electrode relative to the work-piece during the application of a train of voltage pulses or a single voltage pulse should be accomplished by moving the processing electrode towards the work-piece until they touch each other and by separating them further to obtain the required gap therebetween.

Advantageously, the velocity with which the processing electrode is moved towards the work-piece should be decreased before that electrode touches the work-piece.

Preferably, the length of each of the pulses and/or the space interval between them should be selected in accordance with the amount of the gas content of the interelectrode space.

There is also provided an apparatus for electrochemical processing of work-pieces, comprising a pickup to sense the movement of a processing electrode, said pickup being coupled to a program control unit to control the movement of the processing electrode, and a control unit to control a drive means for the processing electrode, according to invention, the apparatus also comprises two pickups to determine the gas content of the interelectrode space, one of said pickups being coupled to the drive means control unit, a pickup to determine the state of contact of the processing electrode and the work-piece, a processing duty decoder connected to the processing electrode movement program control unit, a control signal detector to decode the control signals characteristic of the required gap, coupled to the processing duty decoder, to the drive means control unit, and to the contact pickup, a program control unit to control the gap value, coupled to the control signal decoder, and a control unit to control the operating duties of a voltage source producing voltages for electrochemical processing of work-pieces, said control unit being coupled to the control signal decoder and to a second one of said gas content pickups.

Advantageously, the contact pickup should comprise a voltage source producing a voltage less than the water decomposition potential, said voltage source being coupled to an input of an AND gate, the other input of the AND gate being coupled, via a delay, to a flip-flop, and the output of the AND gate being used as the output of the contact pickup.

Preferably, each of the gas content pickups should be a converter intended to convert short-term partial voltage drops resulted from partial breakdowns in the interelectrode space, which breakdowns are resulted, in turn, from short-term breakdowns in a gas-fluid layer in the interelectrode space, said converter being operated in the case when a short-term voltage drop reaches a value corresponding to a certain operating threshold.

Advantageously, the control signal decoder comprises four flip-flops, a first one of said flip-flops having its input coupled to the output of the contact pickup, and having its output coupled to a pulse train control flip-flop, a second one of the flip-flops having its input coupled to the output of the pulse train control flip-flop, and having its output coupled to an input of a third one of said flip-flops which has its output coupled to an input of a fourth one of said flip-flops, the other inputs of said four flip-flops being joined together, the reset inputs of said four flip-flops being coupled to the processing duty decoder, the outputs of the first, second and fourth flip-flops being coupled, via a signal converters, to the drive means control unit, the outputs of said four flip-flops being coupled, via respective signal converters, to the gap value program control unit, the other input of the pulse train control flip-flop and its output being coupled to the control unit adapted to control the operating duties of the voltage source producing voltages for electromechanical processing of work-pieces.

The method and apparatus of the invention make it possible to process work-pieces of complex spatial configuration with a preset processing accuracy and higher production rate and to process work-pieces electrochemically on a completely automated basis.

DESCRIPTION OF THE DRAWINGS

The invention will now be described, by way of example, with reference to the accompanying drawings in which:

FIG. 1 shows a processed work-piece and a processing electrode, according to the invention;

FIG. 2 is a diagram illustrating now the gap changes its value in the course of electrochemical processing, according to the invention;

FIG. 3 is a time diagram illustrating a train of voltage pulses, according to the invention;

FIG. 4 is a block diagram of an apparatus for electrochemical processing;

DESCRIPTION OF THE INVENTION

Figure 5:
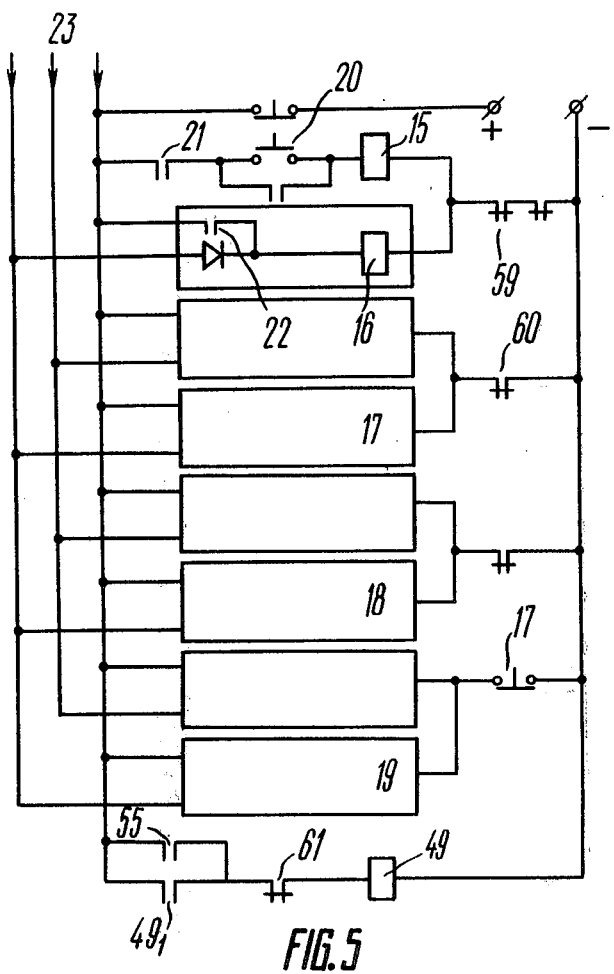
FIG. 5 is a block diagram of a processing duty decoder, according to the invention.

Described below are processing steps for a work-piece of a complex spatial configuration, for example, a connecting rod die, performed with the help of an electrochemical copying-piercing machine with an accuracy of 0.04 mm.

Knowing data relating to the material and shape of the work-piece and processing electrode, the feed rate and others, one can empirically determine a program according to which the gap between the work-piece and the processing electrode is to be changed and also the value of the applied voltage. Thus, the required processing accuracy is attained. For the above-mentioned example, specific digital data is provided.

A d.c. voltage of 10 V is applied to a processing electrode 1 (FIG. 1) and to a work-piece 2 and a 15-percent water solution of NaCl is pumped through the electrode 1. The electrode 1 is moved with a velocity that allows a gap to be selected between it and the work-piece 2 (hereinafter called as the electrode 2), which gap being equal to a minimum permissible one and corresponding to variable processing conditions. In the first place, that value of the gap is determined by the depth of penetration of the electrode 1. Said gap is selected depending on the gas content of the interelectrode space, which is represented by the amount of hydrogen-fluid mixture in the vicinity of the surface of the electrode 1. The gas content is selected to be equal approximately to a critical value at which an increase in the velocity of movement of the electrode 1 by 5 to 15 percent results in sparking and further short-circuit of the electrodes.

The value of the interelectrode space is checked every 60 seconds. To this end, the voltage is removed from the electrodes, the electrode 1 is moved until it touches the electrode 2 and the path covered is measured. After the point of contact is reached, the electrode 1 is reset, and the path passed by the electrode 1 till the point of contact is compared to the preset gap value of 0.10 mm at which the required processing accuracy is attained.

At a depth of 10 mm, the path passed by the electrode 1 till the point of contact reaches a critical value of 0.09 mm, which corresponds approximately to the preset gap value. The depth at which the interelectrode space reaches the critical value can be determined by other means. For instance, analytical method can be used in which experimental test is performed in processing a first work-piece.

When the critical value of the gap is obtained at point $X_1$ (FIG. 1), the electrode 1 is moved with a velocity of 500 mm/min., but is not reset and is displaced by a value of $X_5$ equal to 0.08 mm (FIG. 2). The electrode 1 is stopped in that position and a train of voltage pulses 3 (FIG. 3) is applied to the electrodes, said train having the following characteristics: pulse length, 40 ms; space interval, 40 ms; and train duration, 2 s.

After cessation of the pulse train 3, the electrode 1 is withdrawn to obtain a gap value of $X_7$ equal to 0.35 mm so as to allow for the removal of the electrolysis products from the interlectrode space. After that, the electrode 1 is moved towards the electrode 2 and its velocity is decreased three-fold when it reaches point $X_9 = 0.03$ mm.

After the electrodes 1,2 touch each other, the cycle is repeated within which the electrode 1 is moved and the train of voltage pulses 3 is applied.

During the application of a voltage pulse 3 of the pulse train (FIG. 3), the electrolysis products are accumulated and the gas content reaches a preset value. At that point in time, the pulse ceases, and the space interval is increased by a factor of 1.5. Thus, the length of the voltage pulses is selected depending on the processing conditions.

As the electrode 1 approaches greater depth, the removal of the electrolysis products becomes more difficult, the pulse length is decreased, and the space interval is increased.

At depth $X_2 = 13$ mm, the space interval becomes equal to 200 ms, a value commensurate with the withdrawal time for the electrode 1 to remove the electrolysis products.

Now, a gap of $X_6 = 0.04$ mm is selected between the electrodes 1,2 which ensures the required processing accuracy and a single voltage pulse is applied to the electrode having a length corresponding to a minimal length of a voltage pulse belonging to said pulse train.

The depth $X_2$ at which the pulse train processing ceases is selected using the above-mentioned means for determining the depth corresponding to the critical gap.

As the electrode 1 approaches greater depth during the application of a single voltage pulse the latter ceases when the gas content reaches a preset value.

After the required depth of processing, $X_3 = 15$ mm, is obtained, the machine is stopped and the electrode 1 is brought to its initial position $X_4$.

With the described method, the processing time for a connecting rod die increases from 12 to 55 minutes, but the fitter's finishing time for the work-piece decreases from 20 hours to 3 hours.

The apparatus for electrochemical processing, which carries out, according to the invention, the above-described method comprises a pickup 4 (FIG. 4) to sense the movement of the processing electrode, pickups 5,6 to sense the gas content of the interlectrode space, and a pickup 7 to sense the state of contact of the processing electrode and the work-piece. The apparatus also comprises a program control unit 8 to control the movement of the processing electrode, a control unit 9 to control a drive means of the processing electrode, a program control unit 10 to control the gap value, and a control unit 11 to control the operating duties of a voltage source 12 producing voltages for electrochemical processing.

The gas content pickup 5 is coupled to an input of the drive means control unit 9, while the gas content pickup 6 is coupled to an input of the control unit 11.

The program control unit 8 is coupled to a processing duty decoder 13 which is coupled to a control signal decoder 14 handling control signals characteristic of the required gap.

The control signal decoder 14 is coupled to the control unit 9, to the contact pickup 7, to the program control unit 10, and to the control unit 12.

The program control units 8,10 are adapted to control the movement of the processing electrode 1 along the axis X, with $X = X_1, X_2, X_3, X_4$ (FIG. 1) and $X = X_5, X_6, X_7, X_8$, respectively said coordinates corresponding to inerelectrode spaces for the pulses-cyclic mode in which a train of voltage pulses 3 (FIG. 3) is applied. Here, $X_1, X_2, X_3$ are the current values of the processing depth, namely, the position of the processing electrode; $X_4$ is the coordinate of the initial position of the processing electrode; $X_5, X_6$ are the interelectrode spaces for pulse modes in which a train of pulses or a single pulse is applied, $X_6 < X_5$; $X_7$ is the interelectrode space in the case when the electrode 1 is withdrawn so as to allow for the removal of the electrolysis products; $X_8$ is the interelectrode space obtained in decreasing the velocity of movement of the processing electrode 1 to the work-piece 2.

The processing duty decoders 13, 14 are adapted to decode the signals obtainable from the units 8,10 and to form respective control signals. The decoder 13 comprises a set of similar circuits each of which includes relays 15,16,17,18,19 (FIG. 5) coupled by virtue of a start push-button 20. Normally-open contacts 21,22 of the relay 16 are available at an input 23 of the decoder 13.

The control signal decoder 14 has flip-flops 24,25, 26,27 (FIG. 6) and a signal converter 28. An input 29 of the flip-flop 24 is coupled to the output of the contact pickup 7, and the output of the flip-flop 24 is coupled to a pulse train control flip-flop 30. The flip-flop 25 has its input 31 coupled to the output of the flip-flop 30 and has its output coupled to an input 32 of the flip-flop 26 whose output is coupled to an input 33 of the flip-flop 27. Inputs 34 of the flip-flops 24–27 are joined together, whereas reset inputs 35 of these flip-flops are coupled to the processing duty decoder 13.

The outputs of the flip-flops 24,25,27 are coupled, via a signal converter 28, to the drive means control unit 9 (FIG. 4). The outputs of the flip-flops 24–27 (FIG. 6) are coupled, via signal converters 36,37,38,39, to the gap value program control unit 10 (FIG. 4), while the second input and the output of the pulse train control flip-flop 30 are coupled to the control unit 11.

Figure 7:
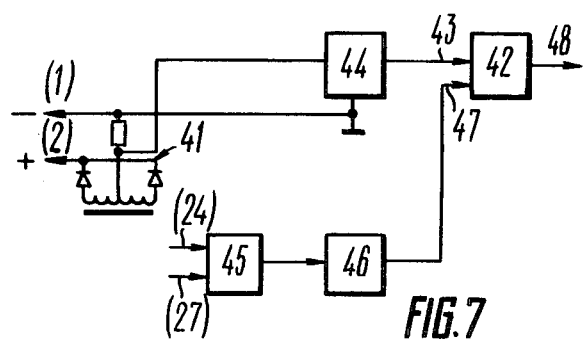
FIG. 7 is a block diagram of a pickup to sense the state of contact of the processing electrode and the work-piece, according to the invention.

The contact pickup 7 (FIG. 4) comprises a voltage source producing a voltage less than the water decomposition potential, said voltage source including a rectifier 41 (FIG. 7), an AND gate 42 having its input 43 coupled to the rectifier 41 via a signal converter 44, and a flip-flop 45 whose output is coupled, via a delay 46, to an input 47 of the AND gate 42. The output of the AND gate 42 is used as the output of the contact pickup 48.

The gas content pickups 5,6 (FIG. 4) are converters intended to convert short-term voltage drops resulted from partial breakdowns in the interelectrode space, which breakdowns are resulted, in turn, from short-term breakdowns in a gas-fluid layer. Such a converter operates in the case when a short-term voltage drop reaches a value corresponding to a certain operating threshold, and utilizes conventional elements, for example, RC circuits.

The apparatus of the invention operates in the following manner. Depressing the push-button 30 of the processing duty decoder 13 results in energization of the relays 15, 49 (FIG. 5). The relay 15 uses its contacts 50 to reset the flip-flops 24–26 (FIG. 4) of the decoder 14 and to cause the flip-flop 27 to take up the opposite state; in that state, the flip-flop 27 is held by virtue of contacts 51 of the relay 15. The relay 49 uses its contacts $49_1$ to initiate the movements counting mode for the program control unit 8. In addition, the energization of the relay 15 provides for monitoring coordinate $X_1$ (FIG. 1). The output of the converter 28 (FIG. 6) produces a signal applied to the inputs of the AND gates 52. The output of the AND gate 52 produces a signal characteristic of the forward movement of the electrode 1 with a slow velocity, said signal being applied to the unit 9. Thus, the electrode 1 begins to move with a velocity of 3 to 5 mm/min. At the same time, the output of the AND gate 53 produces a signal applied to the input of the unit 11, with the result that a d.c. voltage is applied to the electrodes 1,2.

As the electrodes 1,2 approach each other, the gas-fluid layer in the interlectrode space is subject to breakdown. As a result, short-term voltage drops across the electrodes 1,2 appear. If the amplitude of these drops reaches the operating threshold of the pickup 5, the output of the latter produces a signal applied to the unit 9 which produces an inhibit signal of a duration of 0.1 to 0.5 s. The latter signal is applied to the input 54 of the AND gate 52. As a result, the signal corresponding to a slow feed rate ceases to be at the output of the AND gate 52. Also, the signal at the output of the unit 9 ceases and the electrode 1 is stopped. The interelectrode space begins to increase and no signal appears at the output of the pickup 5. After 0.1–0.5 s, the electrode 1 begins to move. If the rate of stoppage of the electrode 1, according to the signal from the pickup 5, exceeds a preset limit selected in a range from 0.2 to 1 Hz, the control unit 9 operates to decrese its own voltage output, thereby resulting in a decrease in the feed rate of the electrode 1. The steps described above make it possible to maintain a minimum permissible gap between the electrodes 1,2, which provides for adequate electrochemical processing.

The d.c. voltage is applied to the electrodes 1,2 until the electrode 1 approaches point $X=X_1$ (FIG. 1). Under these conditions, the unit 8 produces a signal applied to the decoder 13, the relay 15 is de-energized and the relay 16 is energized. The relay 15 uses its contacts 55 to de-energize the unit 8 and to energize the program control unit 10. The contacts 22,56,57 of the relay 16 are operated to bring the unit 8 to the mode in which coordinate $X_2$ is monitored; in this case, the input of the AND gate 53 is blocked and the flip-flops 24,27 are unblocked. In this case, the output of the AND gate 52 produces a signal characteristic of a slow feed rate, and the electrode 1 is moved towards the electrode 2. At this point in time, the continuous operating mode is terminated.

Figure 6:
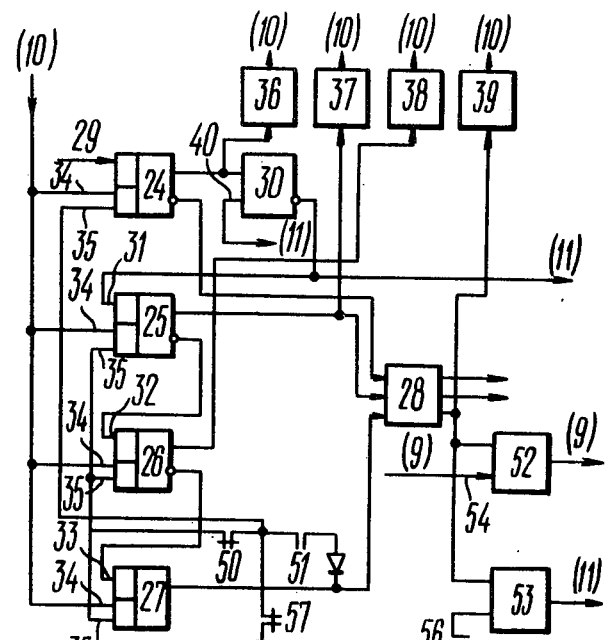
FIG. 6 is a block diagram of a control signal decoder, according to the invention.

When the electrodes 1,2 touch each other, a signal from the rectifier 41 (FIG. 7) is applied to the input of the converter 44 whose output produces voltage pulses passed, via the AND gate 42, to the input of the flip-flop 24 (FIG. 6). The flip-flop 24 takes up the other state and the signal converter 28 produces a signal characteristic of the withdrawal of the electrode 1. In this case, a signal to monitor the interelectrode space $X_5$ is passed via the converter 36 to the unit 10, and a reset/count initiation signal is passed via the converter 39.

With the flip-flop 24 caused to take up the other state, the flip-flop 45 assumes the other state too and the output of the latter produces a signal to block the input of the AND gate 42. This results in a condition in which spurious signals, resulted, for example, from shorting the electrodes 1,2 by electrically conducting particles, fail to pass to the output of the AND gate 42.

With the electrode 1 at point $X=X_5$, the unit 10 produces a signal applied to the decoder 14. Under these conditions, the flip-flops 24,27 are reset and the pulse train control flip-flop 30 assumes the other state. Now, a signal to form a train of voltage pulses is applied to the unit 11.

If, during the present voltage pulse, the gas content of the gap between the electrodes 1,2 reaches a value at which the amplitude of short-term voltage drops at the electrodes becomes commensurate with the operating threshold of the pickup 6, the output of the latter produces a signal applied to the unit 11 and the present pulse ceases. With this method, the length of each pulse of the train is adjusted in accordance with the gase content of a present value, which means that an optimum length of the voltage pulses applied to the electrodes is selected automatically.

According to a signal from the control unit 11, the flip-flop 30 is reset and the train of voltage pulses 3 ceases. At the same time, the flip-flop 25 operates and the output of the converter 28 produces a signal characteristic of the withdrawal of the electrode 1. The latter signal is applied to the control unit 9 and the electrode 1 is withdrawn. According to a signal from the flip-flop 25, passed via the converter 37, the unit 10 assumes the mode of the monitoring coordinate $X=X_7$.

With the electrode 1 appearing at point $X_7$, the unit 10 produces a control signal causing the flip-flop 25 to reset and the flip-flop 26 to operate. At the output of the converter 28 the signal representative of the forward movement of the electrode 1 takes place the signal representative of its withdrawal, and the unit 10, actuated by a signal from the flip-flop 26 via the converter 38, assumes the mode of monitoring coordinate $X=X_8$. With the electrode 1 at $X_8$, the unit 10 produces a control signal which causes the flip-flop 26 to reset and the flip-flop 27 to take up the other state. As a result, at the output of the converter 28 the signal representative of the forward movement of the electrode 1 ceases and the signal representative of a slow movement of that electrode. The latter signal is applied to the control unit 9. In this case, the converter 39 and the unit 10 are in a blocked condition.

The flip-flop 45 of the pickup 7 (FIG. 7) is reset and its output produces a signal which passes via the delay 46 to unblock the AND gate 49. Now, the pickup 7 is ready to operate.

The delay time worked out by the delay 46 depends on the time within which the flip-flops 26,27 are transferred to the fullest extent from one stable state to another. With this time delay, the pickup 7 is not subject to spurious operation when the electrodes 1,2 are shorted by electrically conducting particles and the flip-flops 26,27 operate without failure.

When the electrodes 1,2 touch each other, the operating cycle is performed (again and the current value of X varies in accordance with the curve 58 (FIG. 2) until the electrode 1 approaches point $X=X_2$. In this case, the unit 8 produces a control signal to energize the relay 17 which operates to make the contacts of the unit 11 and of the input circuits of the units 10,8 (the contacts not shown in the drawings). As a result, the electrode 1 is moved to assume a position at $X_3$ according to the law represented by the curve 58 (FIG. 2), and is withdrawn to assume a position at $X_6$. According to a signal from the unit 11, the voltage source 12 produces a single voltage pulse.

With the electrode 1 moved to $X=X_3$, the unit 8 produces a control signal to de-energize the relays 16,17, to energize the relay 18, and to transfer the unit 8 to the mode of monitoring coordinate $X=X_4$. In the de-energized state, the relay 16 causes the flip-flops 24–27 to reset. No signal appears at the output of the converter 28 and making the contacts 59,60 of the relay 18 results in the appearance at the output of the converter 28 of a signal characteristic of the withdrawal of the electrodes 1 which now approaches point $X=X_4$.

At the same time, a signal from the unit 8 results in de-energization of the relays 18,49 and in operation of the relay 19. The contacts 61 are made, the electrode 1 is stopped, and the unit 8 is brought out of the mode of controlling the movement of the electrode 1. Now, the processing of the work-piece is terminated. The processing accuracy corresponds to the selected current values of coordinate X.

The processing is fully automated.

What is claimed is:

1. A method of electrochemical processing of workpieces of electrically conducting materials comprising the steps as follows; applying a d.c. voltage to a processing electrode and to a work-piece; moving the processing electrode until a gap between it and the work-piece is obtained; pumping, in the course of the electrode movement, a water solution of an electrolyte; maintaining said gap variable to obtain its value equal to a minimum permissible one at which adequate processing is achieved; with the gap value reaching a critical one at which the required accuracy of processing is decreased, adjusting the processing electrode with respect to the work-piece so as to bring the gap value to that approximately equal to or less than said critical value; applying a train of voltage pulses to the electrodes which corresponds to a preset value of said gap; withdrawing the processing electrode, after cessation of said train of voltage pulses, so as to allow for the removal of the electrolysis products from the interelectrode space; changing the length of each of said pulses and/or the space interval therebetween to attain conditions under which the electrolysis products are removed adequately; with the space interval increasing up to a value commensurate with the withdrawal time for the processing electrode, applying a single voltage pulse and adjusting the processing electrode relative to the workpiece to obtain a gap with which the required processing accuray is achieved.

2. A method as claimed in claim 1, in which the gap between the processing electrode and the work-piece, equal to a minimum permissible gap, is held variable in accordance with the gas content of the interelectrode space.

3. A method as claimed in claim 2, comprising a step in which setting the processing electrode relative to the work-piece during the application of the single voltage pulse is accomplished by moving the processing electrode towards the work-piece until they touch each other and by separating then further to obtain the required gap therebetween.

4. A method as claimed in claim 3, in which the velocity with which the processing electrode is moved towards the work-piece is decreased before that electrode touches the work-piece.

5. A method as claimed in claim 1, comprising a step in which setting the processing electrode relative to the work-piece during the application of the train of voltage pulses is accomplished by moving the processing electrode towards the work-piece until they touch each other and by separating them further to obtain the required gap therebetween.

6. A method as claimed in claim 5, in which the velocity with which the processing electrode is moved towards the work-piece is decreased before that electrode touches the work-piece.

7. A method as claimed in claim 5, in which the length of each of the pulses and the space interval between them is selected in accordance with the gas content of the interelectrode space.

8. A method as claimed in claim 1, in which the length of each of the pulses and the space interval between them is selected in accordance with the gas content in the interelectrode space.

9. A method of electrochemical processing of workpieces of electrically conducting materials comprising the steps as follows: applying a d.c. voltage to a processing electrode and to a work-piece; moving the processing electrode until a gap between it and the work-pieces obtained; pumping, in the course of the electrode movement, a water solution of an electrolyte; maintaining said gap value variable to obtain its equal to a minimum permissible one at which adequate processing is achieved; with the gap value reaching a critical one at which the required accuracy of processing is decreased, adjusting the processing electrode with respect to the work-piece so as to bring the gap value to that approximately equal to or less than said critical value; applying a train of voltage pulses to the electrodes which corresponds to a preset value of said gap; withdrawing the processing electrode, after cessation of said train of voltage pulses, so as to allow for the removal of the electrolysis products from the interelectrode space; changing the length of each of said pulses and/or the space interval therebetween to attain conditions under which the electrolysis products are removed adequately; with the space interval increasing up to a value commensurate with the withdrawal time for the processing electrode, applying a single voltage pulse and adjusting the processing electrode relative to the workpiece to obtain a gap with which the required processing accuracy is achieved.

10. A method of electrochemical processing of workpieces of electrically conducting materials comprising the steps as follows: applying a d.c. voltage to a processing electrode and to a work-piece; moving the processing electrode until a gap between it and the work-piece is obtained; pumping, in the course of the electrode movement, a water solution of an electrolyte; maintaining said gap variable to obtain its value equal to a minimum permissible one at which adequate processing is achieved; with the gap value reaching a critical one at which the required accuracy of processing is decreased, adjusting the processing electrode with respect to the work-piece so as to bring the gap value to that approximately equal to or less than said critical value; applying a train of voltage pulses to the electrodes which corresponds to a preset value of said gap; withdrawing the processing electrode, after cessation of said train of voltage pulses, so as to allow for the removal of the electrolysis products from the interelectrode space; changing the length of each of said pulses and/or the space interval therebetween to attain conditions under which the electrolysis products are removed adequately; with the space interval increasing up to a value commensurate with the withdrawal time for the processing electrode, applying a single voltage pulse and adjusting the processing electrode relative to the workpiece to obtain a gap with which the required processing accuracy is attained.

* * * * *